(No Model.)

J. H. KEEDY.
FORCE FEED SEED PLANTER.

No. 337,268. Patented Mar. 2, 1886.

WITNESSES
M. E. Fowler
J. W. Garner

INVENTOR
J. H. Keedy
By C. A. Snowden
His Attorneys

UNITED STATES PATENT OFFICE.

JOHN H. KEEDY, OF WEST ALEXANDRIA, OHIO.

FORCE-FEED SEED-PLANTER.

SPECIFICATION forming part of Letters Patent No. 337,268, dated March 2, 1886.

Application filed June 23, 1885. Serial No. 169,520. (No model.)

*To all whom it may concern:*

Be it known that I, JOHN H. KEEDY, a citizen of the United States, residing at West Alexandria, in the county of Preble and State of Ohio, have invented a new and useful Improvement in Force-Feed Seed-Planters, of which the following is a specification, reference being had to the accompanying drawings.

This invention relates to an improvement in force-feed seed-planters; and it consists in the peculiar construction and combination of parts that will be hereinafter set forth, and particularly pointed out in the claim.

Figure 1:
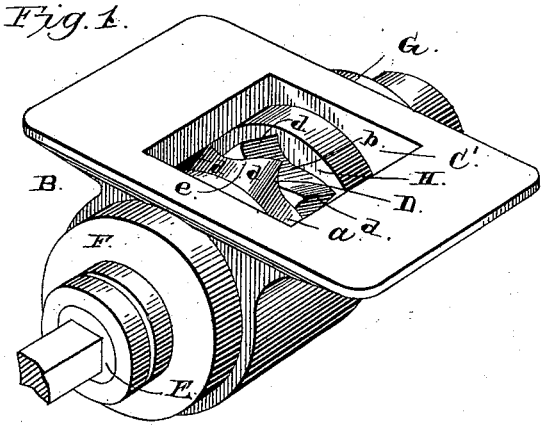
Figure 2:
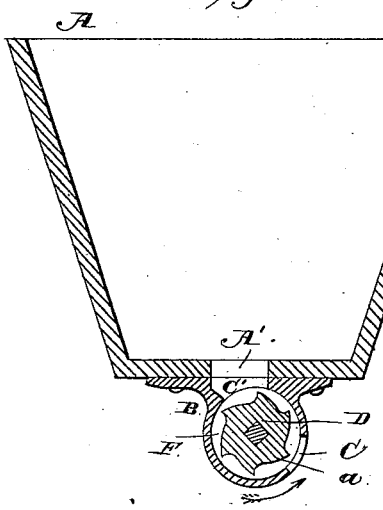
Figure 3:
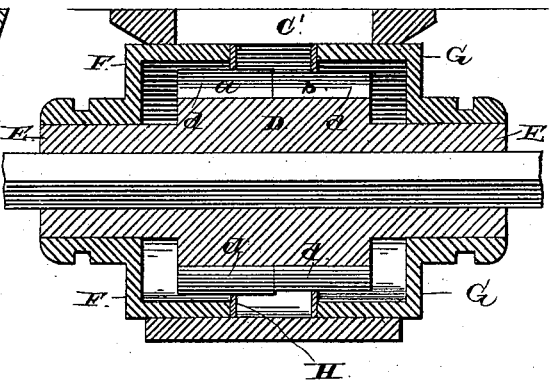
Figure 4:
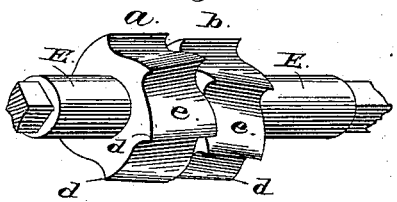

In the accompanying drawings, Figure 1 is a perspective view of my invention. Fig. 2 is a vertical longitudinal sectional view of the same attached to a seed-hopper. Fig. 3 is a transverse sectional view of the same. Fig. 4 is a detail perspective view of the seed-wheel with the regulating cut-offs removed.

A represents the hopper of a seed-planter, which may be of any preferred construction, and is provided with an opening, A', in its bottom, below which is bolted a case, B, which is provided on one side with a discharge-opening, C, and with an inlet-opening, C', that registers with the opening A'. The case B is cylindrical in shape, and in it rotates a seed-wheel, D. No means are here shown for rotating the seed-wheel, as any suitable means may be employed for this purpose, and as such means form no part of this invention. The seed-wheel is provided with a central sleeve or shaft, E, which projects on each side of the wheel, and the seed-wheel itself is formed in two sections, *a b*, which are each provided with feed-teeth *d*, the faces of which incline downwardly from the center toward the sides, and which teeth have their front sides or faces inclined at *e*, the teeth of each section of the wheel being inclined in opposite directions. The teeth of one section of the wheel are out of line with the teeth of the other section thereof, as shown in Fig. 4. This construction of the feed-wheel causes the seeds that fall upon it from the hopper to be forced to the center of the seed-wheel, so as to cause them all to be ejected by the rotation of the seed-wheel through the discharge-opening C.

By having the teeth of one section, *a*, out of line with the teeth of section *b* the inner ends of the teeth form alternately hooks along the center of the seed-wheel. The teeth incline slightly upward and in a diagonal line toward the center of the seed-wheel, so that the alternating hooks are the highest points of the wheel, and thus the seed is sure to be caught by the hooks as it is fed inward toward the center from each side. The hooks catching the seed will force it through the discharge C of the casing, and by the aforesaid peculiar construction of the teeth nothing can clog the wheel. The fact that the teeth of one section are out of line with the teeth of the other section causes the seed to work along the sections in opposite inclined directions, the seed from one section being caught by its own hook in the center and the seed from the other section being similarly caught and carried around and down to the discharge. This insures a force-feed with no clogging.

F G represent cut-offs which slide on the sleeves of shafts E of the seed-wheel and are adapted to cover the sections of said wheel. These cut-offs are slightly larger in interior diameter than the diameter of the sections of the wheel, so as to pass readily over said sections, and the inner edges of said cut-offs are provided with faces or plates H, which are cut to fit the teeth of the sections of the wheel, as shown. These sliding cut-offs correspond in exterior diameter to the interior diameter of the cylindrical case B, and the central line which divides the sections of the seed-wheel registers with the center of the inlet and discharge openings C C'.

The operation of my invention is as follows: The seed-wheel is rotated in the direction indicated by the arrows and forces the seeds from the hopper out through the discharge-opening, as will be readily understood, when the cut-offs F and G are drawn outward on the sleeve of the seed-wheel so as to entirely unclose the inlet and discharge opening, as shown in Fig. 3. By moving these cut-offs inwardly toward each other they are caused to reduce the size of the inlet and discharge openings by partially covering them and thus regulate the quantity of seeds that will be received into and discharged from the case. When the cut-offs are moved far enough inwardly to come in contact with each other, the inlet and discharge openings will be entirely cut off and no seeds will be forced out by the wheel.

It will be readily understood from the foregoing description and by reference to the accompanying drawings that this invention is adapted to regulate the quantity of seed sown, and that the supply of seeds may be entirely cut off when it is desired to cease planting in turning at the end of a row without throwing the operating mechanism out of gear and simply by moving the regulating cut-offs together.

Having thus described my invention, I claim—

The hopper, in combination with the case B, having an opening at each side, the seed-wheel D, having sleeves E at the ends passing through the openings and formed with the feeding-sections $a\ b$ in the center, and the cut-offs F G, independent of each other sliding over the sleeves E to abut against the outer ends of the feeding-sections and working through the openings in the side of the case, as and for the purpose set forth.

In testimony that I claim the foregoing as my own I have hereto affixed my signature in presence of two witnesses.

JOHN H. KEEDY.

Witnesses:
   P. J. CSKERDSY,
   J. McLEAN.